United States Patent [19]

Weinberg

[11] Patent Number: 4,959,765
[45] Date of Patent: Sep. 25, 1990

[54] DC TO DC CONVERTER USING QUASI-RESONANCE

[75] Inventor: Alan Weinberg, Sassenheim, Netherlands

[73] Assignee: Agence Spatiale Europeenne, France

[21] Appl. No.: 314,373

[22] Filed: Feb. 22, 1989

[30] Foreign Application Priority Data

Feb. 24, 1988 [FR] France ............... 88 02239

[51] Int. Cl.⁵ .......................................... H02M 3/335
[52] U.S. Cl. ........................................ 363/20; 363/24; 363/131; 363/134
[58] Field of Search ..................... 363/20, 21, 24, 25, 363/26, 71, 131, 134

[56] References Cited

U.S. PATENT DOCUMENTS

| | | | |
|---|---|---|---|
| 4,415,959 | 11/1983 | Vinciarelli | 363/21 |
| 4,675,797 | 6/1987 | Vinciarelli | 363/21 |
| 4,720,667 | 1/1988 | Lee et al. | 323/235 |
| 4,785,387 | 11/1988 | Lee et al. | 363/21 |
| 4,788,634 | 11/1988 | Schlecht et al. | 363/21 |
| 4,823,249 | 4/1989 | Garcia | 363/24 |
| 4,841,220 | 6/1989 | Tabisz | 363/16 |

FOREIGN PATENT DOCUMENTS

| | | | |
|---|---|---|---|
| 0077958 | 1/1986 | European Pat. Off. | |
| 176413 | 4/1986 | European Pat. Off. | 363/20 |
| 0223504 | 5/1987 | European Pat. Off. | |
| 2608857 | 6/1988 | France | |

OTHER PUBLICATIONS

IEEE Transactions on Aerospace and Electronic Systems, vol. AES-16, No. 5, Sep. 1980, pp. 615-619, Kurt K. Hedel, "High-Density Avionic Power Supply".

Primary Examiner—William H. Beha, Jr.
Attorney, Agent, or Firm—Andrus, Sceales, Starke & Sawall

[57] ABSTRACT

A quasi-resonant DC to DC converter having zero-current and zero-voltage switching includes a transformer with primary and secondary windings, and periodic switching means connected in series with the primary winding. The converter further includes an input capacitor parallel to the transformer's primary winding and an output capacitor parallel to the secondary winding. The topology of the converter is determined by selecting an input capacitor having a capacitance much lower than the output capacitor, by selecting the resonance period of a circuit including the input capacitor and the overall series inductance of the transformer to be shorter than the ON period of the periodic switching means, and by selecting the resonance period of a circuit including the overall parasitic capacitance, referred to the primary side of the transformer and the periodic switching means, and the magnetizing inductance of the transformer to be shorter than the OFF period of the periodic switching means.

5 Claims, 3 Drawing Sheets

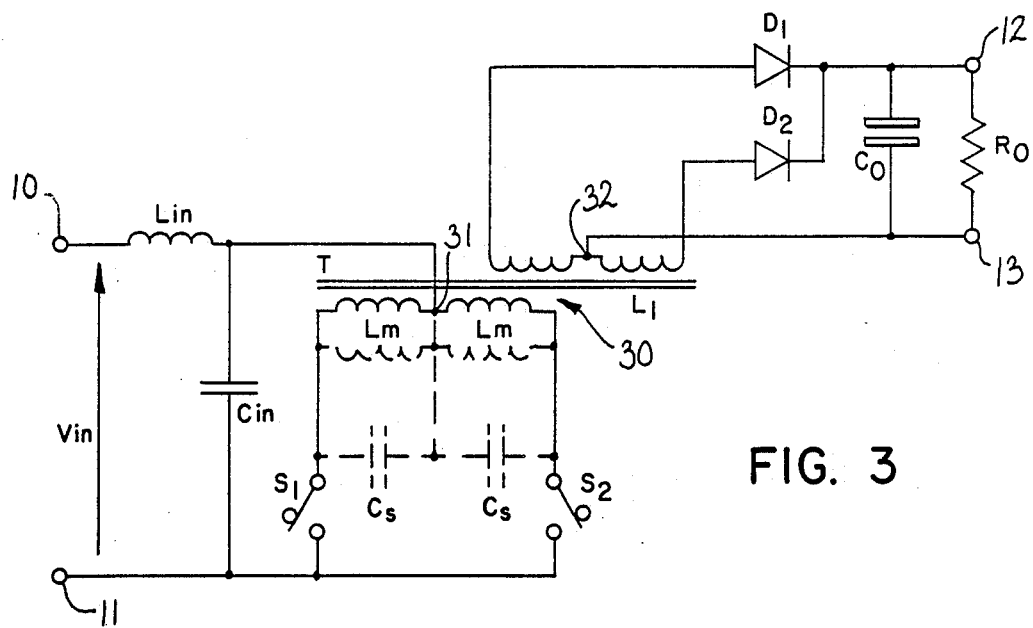
FIG. 3
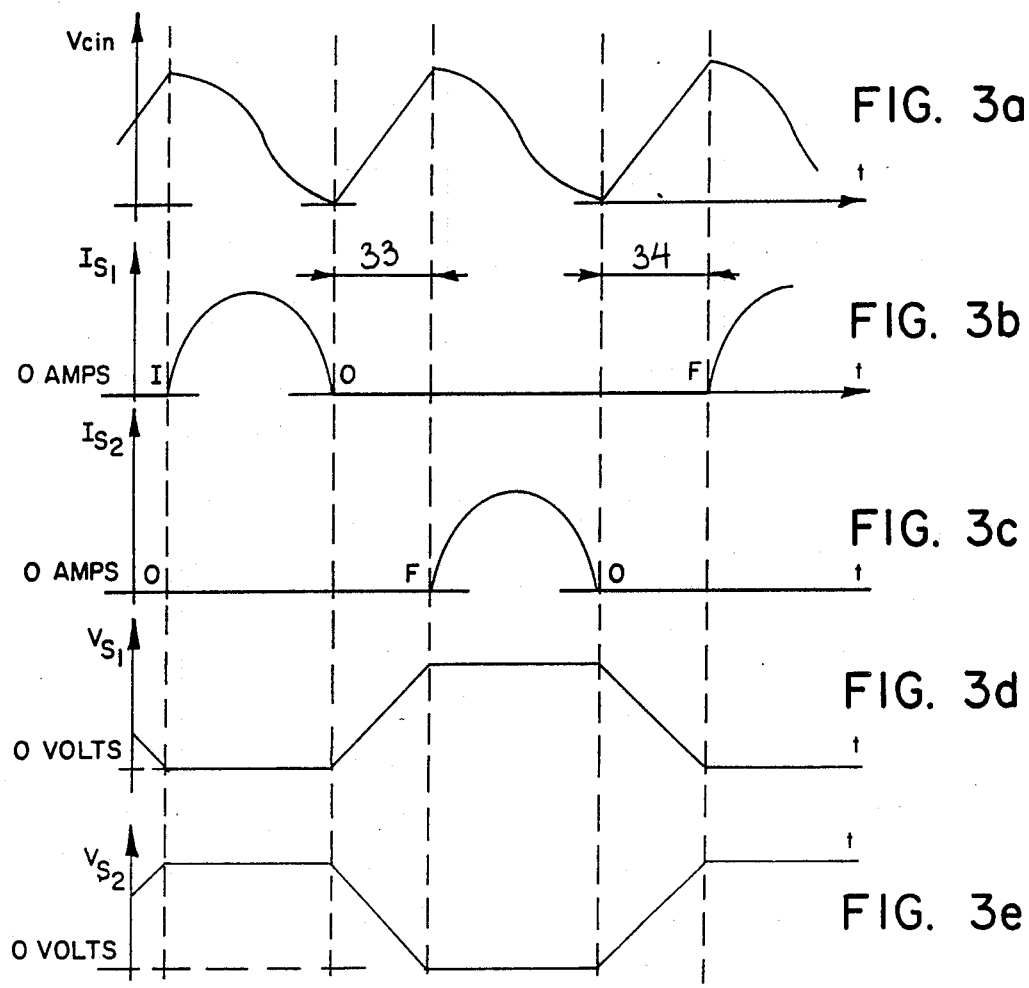
FIG. 3a
FIG. 3b
FIG. 3c
FIG. 3d
FIG. 3e

DC TO DC CONVERTER USING QUASI-RESONANCE

The present invention relates to DC/DC converters, in particular to such converters used for electronic power conditioners (EPC) for traveling wave tubes amplifiers (TWTA). The present invention is also useful for high frequency DC/DC converters.

Such converters comprise a transformer, periodic switching means in series with the primary winding of said transformer, an input capacitor connected in parallel with a DC power source and an output capacitor connected in parallel with a load.

One of the most serious problems encountered in the design of such converters is due to the high voltages across the switches and to the parasitic voltages occurring during the switching of the switching means.

Moreover, the parasitic reactances of the transformer's windings introduce some disturbance particularly when operating at high frequency.

The European patent 0 077 958 of Oct. 9, 1982 discloses a DC/DC converter in which the current flowing through the switches at the time of their commutation is cancelled by using several electronic central circuits for generating, synchronizing and inserting cancellation periods of the current within the commutation cycle. This involves the use of complicated and onerous electronic circuits.

The U.S. Pat. No. 4,415,959 to P. Vinciarelli discloses a DC/DC converter having a zero switching current. This converter uses a transformer the leakage inductance of which constitutes a quasi-resonant circuit with the output capacitor. It is therefore possible to cancel the switching current of on the periodic switching means. But, however, this known DC/DC converter has a high ripple voltage at its output.

The object of the present invention is to provide a DC/DC converter such as an electronic power conditioner (EPC) for travelling wave tube amplifiers (TWTA), that does not present the above-cited drawbacks.

In the DC/DC converter according to the present invention, the capacitance of the input capacitor ($C_{in}$) is much lower than the capacitance of the output capacitor ($C_o$), the resonance period of the circuit determined by the input capacitor ($C_{in}$) and the overall series inductance of said transformer is shorter than the on period of said periodic switching means (S, $S_1$, $S_2$), and the resonance period of the circuit determined by the overall parasitic capacitance of the total circuit primary referred to the side of said transformer and of said periodic switching means and by the magnetizing inductance of said transformer is shorter than the off period of said periodic switching means.

According to another feature of the invention, a tuning capacitor is connected in parallel with said periodic switching means, to tune the duration of the resonance period occurring during the off period of the switching means.

One embodiment of the present invention is a push-pull DC/DC converter in which said transformer comprises a primary winding with a mid-point connection and said periodic switching means are constituted by two switches being respectively connected in series with one end of said primary winding; in this case, said overall parasitic capacitance is the overall total parasitic capacitance as referred to the switched side of the transformer.

Other advantages and features will become apparent from the following description of preferred embodiments and from the claims. In this description:

FIG. 3 is the diagram of a push-pull DC/DC converter according to the present invention, FIGS. 3a to 3e show characteristic curves of the circuit of FIG. 3.

Figure 1:
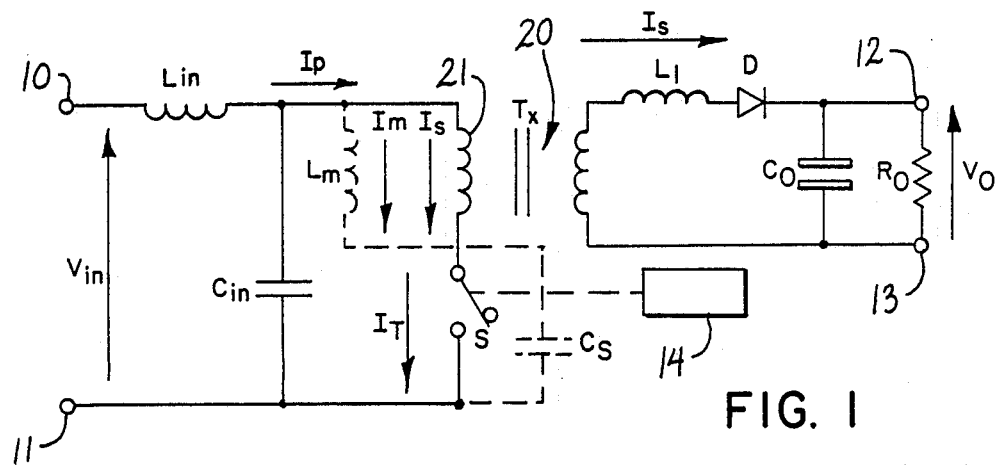
FIG. 1 is the diagram of the first embodiment of the present invention.

Referring to FIG. 1, a DC/DC converter comprising a primary winding 21 is supplied with a constant DC voltage $V_{in}$ that is applied to terminals 10 and 11. The primary circuit of the transformer 20 comprises a series input inductance $L_{in}$ and a parallel input capacitor $C_{in}$.

The secondary circuit of this converter comprises a series of inductance $L_1$ and a capacitor $C_o$ parallel to the output; the secondary current is rectified by a diode D and applied to a load represented by a resistor $R_o$ connected to output terminals 12 and 13. In the primary circuit, switching means S is connected in series with the primary winding 21. This switching means S constitutes a periodic switching means, for instance a field-effect transistor FET, that is controlled by a control circuit 14. The magnetizing inductance $L_m$ and the overall stray or parasitic capacitance $C_s$ are shown in dotted lines.

According to the present invention, the value of the input inductance $L_{in}$ is much greater than the total series inductance between $C_{in}$ and $C_o$. The input capacitance $C_{in}$ is much lower than the corresponding value of the output capacitor $C_o$.

The input capacitor $C_{in}$ and the series inductance $L_s$ which includes the leakage inductance of the transformer and the output inductance $L_1$ form a resonat circuit the period of which is:

$$T = \pi \sqrt{L_s \cdot C_{in}}.$$

Figure 2A:
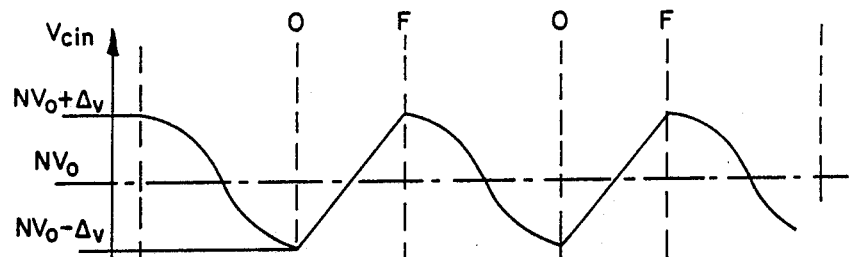
FIGS. 2a to 2c show characteristic curves of the circuit of FIG. 1.
Figure 2B:
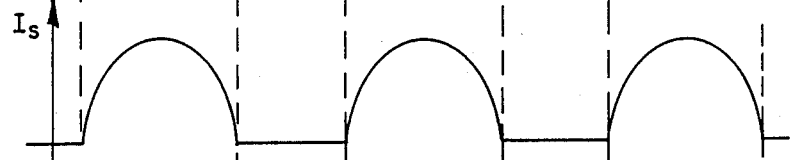
Figure 2C:

According to the present invention, this period T is shorter than the closed or on period of the periodic switching means S. As a result, the current $I_s$ in the switch S, which is shown in FIG. 2b, has the shape of a half sinusoid 22. The curve 2a shows the voltage across the input capacitor $C_{in}$ that decreases from the value $NV_o + dV$ to the value $NV_o - dV$, N being the nominal transformation ratio of the transformer 20.

The curve 2c represents the voltage across the switch S; according to the present invention, the resonance period of the circuit constituted by the magnetizing inductance $L_m$ and the overall stray or parasitic capacitance $C_s$ is shorter than the open or off period of the periodic switching means. As a result, the voltage across the switch S presents the shape of a half sinusoid 23; this voltage returns to zero before the new closing operation of the switch S; as a result, there is no loss in the parasitic elements $L_m$ and $C_s$.

The magnetizing current $I_m$ that is flowing through the magnetizing inductance $L_m$ must be added to the current $I_s$ of the primary winding 21 for obtaining the total primary current $I_p$. This means that when the current $I_s$ comes to zero after the half-sinusoid 22, the magnetizing current $I_m$ remains. In fact, since the magnetizing current is very low, the switching losses due to the closing of the switch S are very low.

Figure 5A:
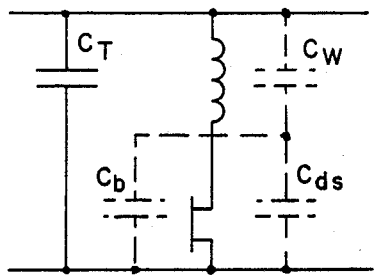
FIGS. 5a and 5b are detailed diagrams concerning the parasitic or stray capacitance.
Figure 5B:
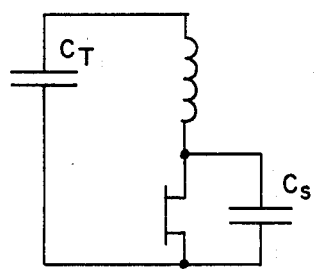

FIG. 5a is a detailed diagram illustrating the parasitic or stray capacitance $C_s$ of FIG. 1. In fact, according to the present invention, the quasi-resonance involves all the parasitic capacitance, i.e. the drain-source capacitance $C_{ds}$ of the power FET constituting the switch S, the winding stray capacitance $C_w$ and any other capacitance $C_h$ due to the physical layout of the circuit board used. All these parasitic capacitances can be combined to provide a total equivalent capacitance $C_s$ connected a shown in FIG. 5b across the FET; if necessary, it is possible to combine this total stray capacitance with the capacitance of a tuning capacitor $C_t$ connected as shown in FIG. 5b, for tuning the resonance period. Tuning capacitor $C_t$ includes the input capacitance $C_{in}$.

FIG. 3 shows another embodiment of the invention as applied to a push-pull DC/DC converter. In this embodiment, the components that are equivalent to those of FIG. 1 are referenced by the same references. The push-pull converter uses a transformer 30 comprising a primary winding with a mid-point connection 31; the periodic switching means are constituted by two switches S1 and S2, each of these being connected in series with one end of the primary winding of the transformer 30. The secondary circuit comprises a full wave rectifier including two diodes D1 and D2 the anode of which is connected to one end of the secondary winding; their cathodes are connected to the positive terminal 12 and the negative terminal 13 is connected to the mid-point connection 32 of the secondary winding.

In this case, the quasi-resonance of the parasitic reactances is realized for each half-winding of the primary winding.

FIGS. 3a to 3e show respectively the voltage across the input capacitor $C_{in}$, the current $I_{s1}$ in one half-winding of the primary winding, the current $I_{s2}$ in the second half-winding of the primary winding, the voltage across the first half-winding and the voltage across the second half-winding.

Both switches S1 and S2 operate in a symmetrical alternate way. During the periods 33 and 34 when both switches are opened, the polarity of the transformer 32 is reversed due to the energy stored in the magnetizing inductance $L_m$. This voltage reversal is controlled by the parallel resonance of the magnetizing inductance $L_m$ and the stray capacitance $C_s$.

Figure 4:
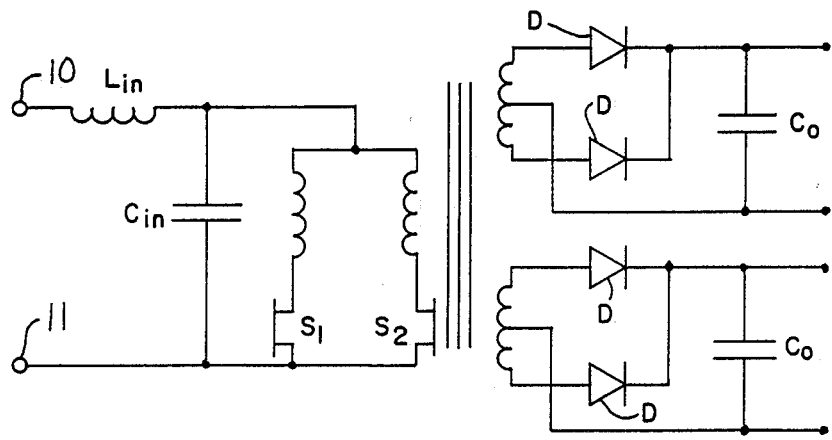
FIG. 4 shows a push-pull multioutput DC/DC converter according to the present invention.

FIG. 4 shows an embodiment of a push-pull DC/DC converter according to the present invention that can comprise several outputs, two of which are shown in the present embodiment.

In a preferred embodiment of the present invention, the values of the different components are the following:

$L_{in}$ = 50 microhenry
$C_{in}$ = 0.1 microfarad
$C_o$ = 1 microfarad

The operation frequency is 500 kHz and the power output is 100 W.

The DC to DC converters according to the present invention are particularly useful for high frequency converters used in spacecraft since losses due to the parasitic reactances are eliminated so that the efficiency is highly improved and the weight is reduced.

I claim:
1. A DC to DC converter for supplying direct current from a source to a load, in particular one for operating at high frequency and for feeding traveling wave tube amplifiers (TWTA), said converter comprising:
   a transformer having a primary circuit connectable to the source and containing a primary winding, said transformer having a secondary circuit connectable to the load and containing a secondary winding, said transformer possessing a magnetizing inductance ($L_m$) and a series inductance ($L_s$);
   periodic switching means (S, S$_1$, S$_2$) connected in series with said primary winding in said primary circuit of said transformer, said switching means switching between a closed period when said switching means is closed and an open period when said switching means is open;
   an output capacitor ($C_o$) connected in parallel in the secondary circuit of said transformer; and
   an input capacitor ($C_{in}$) connected in parallel in the primary circuit of said transformer, the capacitance of said input capacitor ($C_{in}$) being much lower than the capacitance of said output capacitor ($C_o$);
   said converter possessing parasitic capacitance ($C_s$) including that of said primary winding and said periodic switching means, said parasitic capacitance being referrable to the primary circuit of said transformer;
   said input capacitor ($C_{in}$) and said series inductance ($L_s$) of said transformer forming a first circuit in said converter having a resonance period shorter than the on period of said periodic switching means (S, S$_1$, S$_2$) and controlling the current through said periodic switching means in the on periods for reducing the current through said periodic switching means to essentially zero when switching occurs in said switching means, and
   said parasitic capacitance ($C_s$) of said converter referred to primary circuit of said transformer and said magnetizing inductance ($L_m$) of said transformer forming a second circuit in said converter having a resonance period shorter than the off period of said periodic switching means and controlling the voltage across said periodic switching means in the off period for reducing the voltage across said periodic switching means to zero when switching occurs in said switching means.

2. The converter according to claim 1, further including a tuning capacitor ($C_t$) connected in parallel to said periodic switching means for altering the resonance period of said second circuit.

3. The converter according to claim 1, wherein said transformer includes a primary winding with a mid-point connection, said periodic switching means comprising a pair of switches (S$_1$, S$_2$) respectively connected in series with an end of said primary winding, and wherein said parasitic capacitance ($C_s$) is that of one half of the winding and of the associated switch.

4. The converter according to claim 1 wherein said transformer comprises at least two secondary windings, each of which provides an output of said converter.

5. The converter according to claim 1 wherein said primary and secondary circuits are further defined as providing a generally sinusoidally wave form to the current through, and voltage across, said periodic switching means.

* * * * *